United States Patent
Lee et al.

(10) Patent No.: US 8,625,694 B1
(45) Date of Patent: Jan. 7, 2014

(54) SIGNAL PROCESSING FOR INDEPENDENTLY PRODUCED SIGNALS

(75) Inventors: Jungwon Lee, San Diego, CA (US); Jihwan P. Choi, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 388 days.

(21) Appl. No.: 12/938,718

(22) Filed: Nov. 3, 2010

Related U.S. Application Data (60) Provisional application No. 61/258,491, filed on Nov. 5, 2009.

(51) Int. Cl.
*H04B 7/02* (2006.01)
*H04L 1/02* (2006.01)

(52) U.S. Cl.
USPC .............................. 375/267; 375/261; 375/262

(58) Field of Classification Search
USPC .......... 375/261, 262, 267, 286, 298–300, 353
See application file for complete search history.

(56) References Cited

U.S. PATENT DOCUMENTS

2009/0074097 A1* 3/2009 Sadowsky ...................... 375/260
2009/0203310 A1* 8/2009 Lozano et al. .................. 455/15

OTHER PUBLICATIONS

Han, Te Sun, "A New Achievable Rate Region for the Interface Channel," Jan. 1981, IEEE Transactions on Information Theory IT-27(1):49-60, 12 pages.

* cited by examiner

*Primary Examiner* — Curtis Odom (57) ABSTRACT

Systems and techniques relating to wireless communications are described. A described technique includes receiving a signal that represents concurrent wireless data communications, where the signal is based on superimposed signals modulated using different respective constellations; detecting a first signal from the received signal over a first combined constellation, the combined constellation being based on the respective constellations; modifying the received signal based on the first detected signal to remove a signal contribution associated with the first detected signal; and detecting a second signal from the modified received signal over a second constellation. The second constellation can be based on the respective constellations absent a constellation of the respective constellations that is associated with the first detected signal.

18 Claims, 7 Drawing Sheets

SIGNAL PROCESSING FOR INDEPENDENTLY PRODUCED SIGNALS

CROSS REFERENCE TO RELATED APPLICATION

This disclosure claims the benefit of the priority of U.S. Provisional Application Ser. No. 61/258,491, filed Nov. 5, 2009 and entitled "A New Hard Decoding Method For Independently Encoded Signals," which is incorporated herein by reference in its entirety.

BACKGROUND

This disclosure relates to wireless communications.

Wireless communication devices can use one or more wireless communication technologies such as orthogonal frequency division multiplexing (OFDM) or code division multiple access (CDMA). In an OFDM based wireless communication system, a data stream is split into multiple data substreams. Such data substreams are sent over different OFDM subcarriers, which can be referred to as tones or frequency tones. Various examples of wireless communication devices include mobile phones, smart phones, wireless routers, wireless hubs, base stations, and access points. In some cases, wireless communication electronics are integrated with data processing equipment such as laptops, personal digital assistants, and computers.

A wireless communication device can generate a transmission signal based on two or more constituent signals. A signal transmitted over a wireless communication channel may be subject to channel noise such as additive white Gaussian noise (AWGN), Rayleigh fading, or even blockage. To decode a received signal, a device can use information based on characteristics of a constituent signal and one or more channel measurements. In some cases, constituent signals can be encoded using channel encoders of different rates and with different amounts of redundancies. Moreover, constituent signals can be modulated using different signal constellations, respectively. Various examples of coding techniques include Reed-Solomon coding, convolutional coding, and turbo coding. Various examples of modulation techniques include quadrature amplitude modulation (QAM) and pulse amplitude modulation (PAM).

A wireless communication device can perform successive interference cancellation (SIC) ordered decoding to process a received signal that is based on multiple constituent signals. A SIC ordered decoding technique includes detecting the strongest signal by assuming other interfering signals to be Gaussian, decoding the strongest signal, re-encoding and re-modulating the decoded signal, and subtracting the re-modulated signal from the received signal to produce a modified received signal. The next strongest signal is then similarly decoded based on the modified received signal. These operations repeat until all of the constituent signals are decoded. A SIC ordered decoding technique can perform a maximum likelihood (ML) detection over individual signal constellations that are associated with respective constituent signals.

SUMMARY

The present disclosure includes systems and techniques for wireless communications.

According to an aspect of the present disclosure, a technique for wireless communications includes receiving a signal that represents concurrent wireless data communications, where the signal is based on superimposed signals modulated using different respective constellations; detecting a first signal from the received signal over a first combined constellation, the combined constellation being based on the respective constellations; modifying the received signal based on the first detected signal to remove a signal contribution associated with the first detected signal; and detecting a second signal from the modified received signal over a second constellation. The second constellation can be based on the respective constellations absent a constellation of the respective constellations that is associated with the first detected signal.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, one or more disclosed embodiments can be implemented in various systems and apparatus, including, but not limited to, a special purpose data processing apparatus (e.g., a wireless communication device such as a wireless access point, a remote environment monitor, a router, a switch, a computer system component, a medium access unit), a mobile data processing apparatus (e.g., a wireless client, a cellular telephone, a smart phone, a personal digital assistant (PDA), a mobile computer, a digital camera), a general purpose data processing apparatus such as a computer, or combinations of these.

Systems and apparatuses can include circuitry configured to receive a signal that represents concurrent wireless data communications, where the signal is based on superimposed signals modulated using different respective constellations; and processor electronics configured to perform operations comprising i) detecting a first signal from the received signal over a first combined constellation, the combined constellation being based on the respective constellations, ii) modifying the received signal based on the first detected signal to remove a signal contribution associated with the first detected signal, and iii) detecting a second signal from the modified received signal over a second constellation, where the second constellation is based on the respective constellations absent a constellation of the respective constellations that is associated with the first detected signal.

In another aspect, systems and apparatuses can include circuitry configured to store information indicative of a received signal that represents concurrent wireless data communications, where the received signal is based on superimposed signals modulated using different respective constellations. Systems and apparatuses can include circuitry configured to i) detect a first signal from the received signal over a first combined constellation, the combined constellation being based on the respective constellations, ii) modify the received signal based on the first detected signal to remove a signal contribution associated with the first detected signal, and iii) circuitry configured to perform detecting a second signal from the modified received signal over a second constellation. The second constellation can be based on the respective constellations absent a constellation of the respective constellations that is associated with the first detected signal.

Details of one or more implementations are set forth in the accompanying drawings and the description below. Other features and advantages may be apparent from the description and drawings, and from the claims.

DRAWING DESCRIPTIONS

Like reference symbols in the various drawings indicate like elements.

DETAILED DESCRIPTION

A wireless communication device transmits signals to one or more other wireless communication devices. The wireless communication device can superimpose two or more constituent signals to form a transmission signal. In some cases, the wireless communication device transmits the constituent signals on respective antennas for multiple-in-multiple-out (MIMO) based wireless communications. The constituent signals can be separately encoded and modulated. At a receiving device, wireless channel conditions such as noise or fading can increase the complexity of extracting constituent signals from a received signal.

This disclosure includes systems and techniques for extracting, from a received signal, multiple signals that are independently produced such as signals that are independently encoded and modulated. Techniques can include the detection and decoding of two or more signals based on a combined signal constellation. A wireless communication device can use modulation and coding scheme (MCS) information associated with other devices to decode a signal intended for the wireless communication device. One or more of the described techniques can be applied in wireless communication systems such as ones based on 3GPP LTE or IEEE 802.16 WiMAX. One or more the described techniques can be applied to wireless channels such as a multiple access channel, a broadcast channel, an interference channel, or a combination thereof.

A wireless communication device can use circuitry such as encoders and modulators to independently produce K constituent signals based on respective input signals, e.g., data bit streams. The wireless communication device can perform concurrent wireless data transmissions based on superimposing the constituent signals.

For a k-th input signal, an encoder can transform a vector $b_k[m]$ of information bits for the k-th signal to a vector $c_k[m]$ of encoded bits for the k-th signal. Various examples of coding techniques include trellis coding, block coding, convolutional coding, Reed-Solomon coding, and turbo coding.

A modulator can transform a vector $c_k[m]$ of encoded bits for the k-th signal to a vector $x_k[m]$ that represents the k-th constituent signal. Various examples of modulation techniques include quadrature amplitude modulation (QAM) and pulse amplitude modulation (PAM). A modulator can use M-ary QAM, where M refers to the number of points in a constellation. Examples of M-ary QAM include 4-QAM, 16-QAM, and 64-QAM. A modulator can use M-ary PAM, where M refers to the number of points in a constellation. Examples of M-ary PAM include 2-PAM, 4-PAM, and 8-PAM. In some implementations, independently producing K constituent signals can include using 4-QAM to modulate a first signal and using 4-PAM to modulate a second signal. In some implementations, independently producing K constituent signals can include using a first version of 4-QAM to modulate a first signal and a second version of 4-QAM to modulate a second signal. In some implementations, the second version of 4-QAM can be a scaled version of the first version. In some implementations, the second version of 4-QAM uses a different set of points than the first version.

A wireless communication device can perform a summation of the K constituent signals to produce a transmission signal. In some implementations, a device can receive a summation of the K constituent signals, each of which is independently transmitted from an independent device. The device(s) can apply transmit power $P_k$ parameters to respective constituent signals before the summation. A received version of the transmission signal can be represented by $$y[m] = \sum_{k=1}^{K} h_k[m]x_k[m] + n[m]$$

where m represents a time index, $x_k[m]$ represents the k-th constituent signal, $h_k[m]$ represents a k-th channel gain from a transmitter to a receiver, n[m] represents independent and identically distributed (i.i.d.) complex Gaussian noise with mean zero and variance $\sigma_n^2$.

A wireless communication device can generate constituent signals for one or more channel types such as a multiple access channel (MAC), a broadcast channel (BC), an interference channel (IC), or a combination thereof. In some cases, the constituent signals are intended for separate receivers. In some cases, one or more constituent signals are for transmitting a system channel such as a pilot channel or paging channel.

For a multiple access channel, a received version of the transmission signal can be represented by $$y[m] = \sum_{k=1}^{K} h_k[m]x_k[m] + n[m]$$

where m represents a time index, $x_k[m]$ represents the k-th constituent signal, $h_k[m]$ represents a k-th channel gain from a transmitter to a receiver, n[m] represents independent and identically distributed (i.i.d.) complex Gaussian noise with mean zero and variance $\sigma_n^2$.

For a broadcast channel, a received version of a broadcast signal at the i-th receiver can be represented by $$y_i[m] = \sum_{k=1}^{K} h_i[m]x_k[m] + n[m]$$

where a propagation of the transmission signal to the i-th receiving device experiences its own channel gain $h_i[m]$ and noise $n_i[m]$.

For an interference channel, a received version of an interference signal at the i-th receiver can be represented by $$y_i[m] = \sum_{k=1}^{K} h_{ik}[m]x_k[m] + n_i[m]$$

where $h_{ik}[m]$ is a channel gain from the k-th transmitter to the i-th receiver. Here, each receiver has a distinct received signal $y_i[m]$ with $h_k[m]:=h_{ik}[m]$ for every k=1, . . . , K. Note that noise can be indexed per receiver.

A wireless communication device can perform successive interference cancellation (SIC) ordered decoding to process a received signal that is based on two or more constituent signals. Some wireless communication device can detect and decode signals based on considering separate signal constellations. An order of signal decoding is represented by an index numeration of 1, 2, . . . , K. The constituent signal that is decoded first is assigned the i=1 index, the constituent signal that is decoded second is assigned the i=2 index, and so on.

A wireless communication device can detect a first signal in a received signal by treating the expression $$\sum_{k=2}^{K} h_k[m]x_k[m] + n[m]$$

as Gaussian to detect $\hat{x}_1[m]$ and decode $\hat{b}_1[m]$. Detecting a first signal can include computing one or more channel gain values.

Detecting a second signal in a received signal can include re-encoding and re-modulating $\hat{b}_1[m]$ to generate $\hat{\hat{x}}_1[m]$ and computing a modified received signal $v_2$ by subtracting $h_1[m]$ $\hat{\hat{x}}_1[m]$ from $y[m]$. The subtraction can reduce or eliminate the interference caused by the first signal. Detecting a second signal can include using the modified received signal to detect and decode the signal second to detect $\hat{x}_2[m]$ and decode $\hat{b}_2[m]$. The wireless communication device can repeat the process for additional signals, if required. In some implementations, computing a modified received signal includes computing a signal based on $$v_{i+1}[m]=v_i[m]-h_i[m]\hat{\hat{x}}_i[m]$$

where $v_1[m]=y[m]$.

A wireless communication device can use a maximum likelihood detector that considers signal constellations individually. For example, a maximum likelihood detector can detect a signal based on $$\hat{i} = \underset{i}{\mathrm{argmax}} f_{M_i}(y \mid x_i)$$

where $f_{M_i}$ is a conditional probability density function (CPDF) that is considered over the constellation of $M_i$. The detector can determine a signal constellation, and point thereof, that maximizes the CPDF. The maximum likelihood detector can treat signal points of $M_{i+1} \times \ldots \times M_K$ around each signal point of $x_i[m]$ as Gaussian. A conditional probability density function can be computed based on:

$$f_{M_i}(y \mid x_i) = \frac{1}{\pi(\sigma_I^2 + \sigma_n^2)} \cdot \exp\left(-\frac{|y - h_i x_i|^2}{\sigma_I^2 + \sigma_n^2}\right)$$

where $\sigma_I^2$ and $\sigma_n^2$ are the variances of other interfering signals and noise, respectively. In some implementations, a maximum likelihood detector can access a data structure that stores information about signal constellations that are used to modulate signals.

Rather than considering separate constellations to detect constituent signals, a wireless communication device can use a combined constellation to detect an initial signal from a received signal. The wireless communication device can perform successive interference cancellation to increase the likelihood of a successful detection of the remaining signals. The wireless communication device, if required, can combine constellations associated with the remaining signals to detect a subsequent signal.

Figure 1:
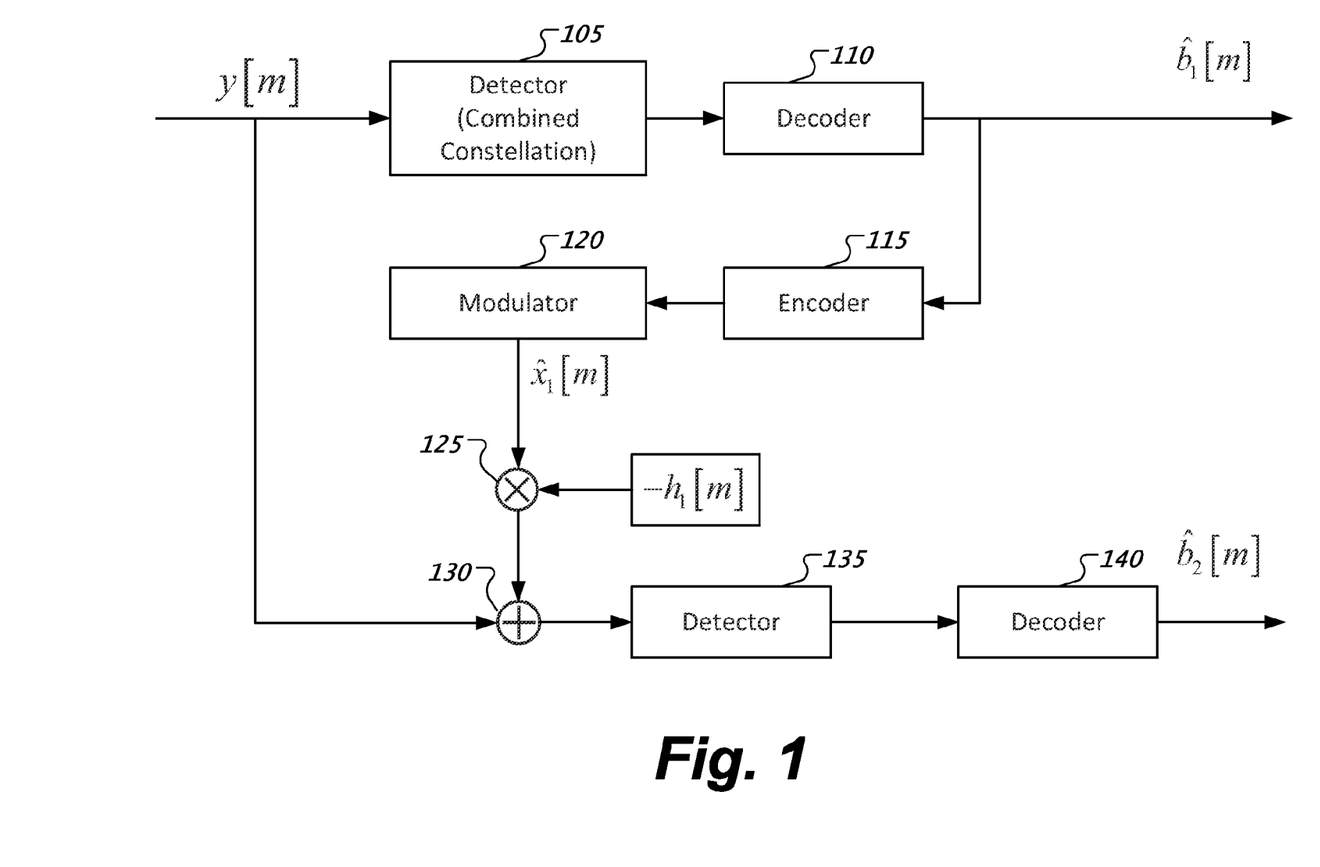
FIG. 1 shows an example of a receiver architecture that is based on a combined signal constellation.

FIG. 1 shows an example of a receiver architecture that is based on a combined signal constellation. A receiver architecture extracts signals from superimposed constituent signals that are modulated with respective constellations. The receiver architecture includes circuitry to perform signal detection (e.g., maximum likelihood detection, minimum distance detection) over a combined version of the respective constellations. A first detector 105, of a receiver architecture, can detect a first signal from a received signal $y[m]$ using a combined constellation. The combined constellation is a product of the respective constellations. The first detector 105 includes a demodulator. A decoder 110 performs decoding on an output of the first detector 105 to produce one or more decoded bits, e.g., a vector $\hat{b}_1[m]$ of decoded information bits, associated with a first signal.

An encoder 115 encodes the decoded information bits associated with the first signal. A modulator 120 modulates the encoded bits to produce an estimated version $\hat{x}_1[m]$ of a constituent signal $x_1[m]$. A multiplier 125 multiplies the estimated version $\hat{x}_1[m]$ and a negative version of the channel gain $h_1[m]$. An adder 130 adds an output of the multiplier 125 with the received signal $y[m]$ to remove the contribution of the first signal from the received signal to produce a modified received signal.

A second detector 135 detects a second signal from the modified received signal using a constellation, which is based on one or more remaining constellations associated with respective one or more remaining signals to be decoded. In a two signal example, the second detector 135 uses the remaining constellation. In a three signal example, the second detector 135 uses a combined version of the remaining two constellations. The second detector 135 includes a demodulator to demodulate the second signal. A decoder 140 performs decoding on an output of the second detector 135 to produce one or more decoded bits, e.g., a vector $\hat{b}_2[m]$ of information bits, associated with the second signal.

A wireless communication device can include independent encoders and modulators for preparing multiple signals for transmission. For example, a wireless communication device can transmit a signal with multiple constituent signals via superimposing two or more signals that have been independently encoded and modulated. For receiving, a wireless communication device can use MCS information of the constituent signals to process a signal. A wireless communication device can receive MCS information via a broadcast control channel. In some implementations, MCS information is predetermined.

Figure 2A:
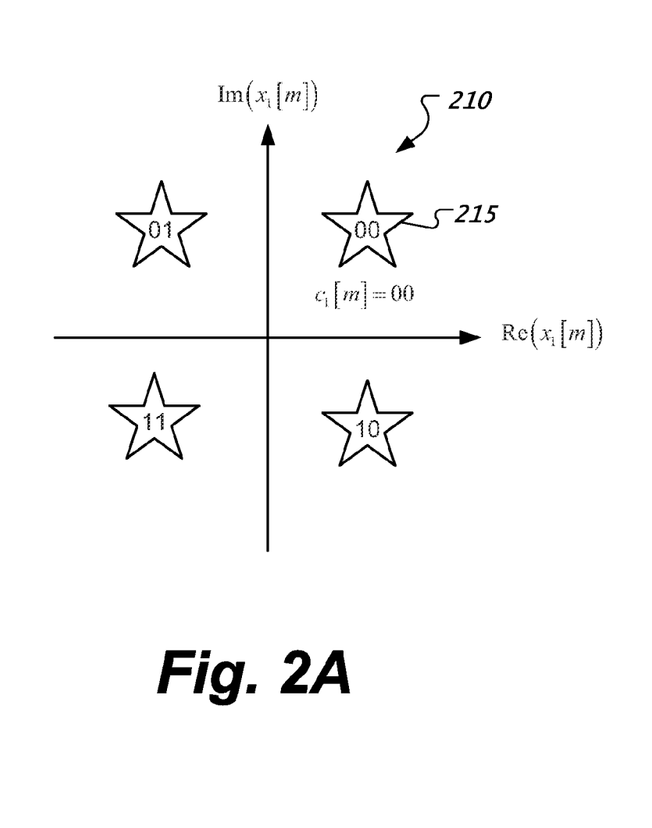
FIGS. 2A, 2B, 2C show different facets of an example of a combination of two signals that are based on different signal constellations.
Figure 2B:
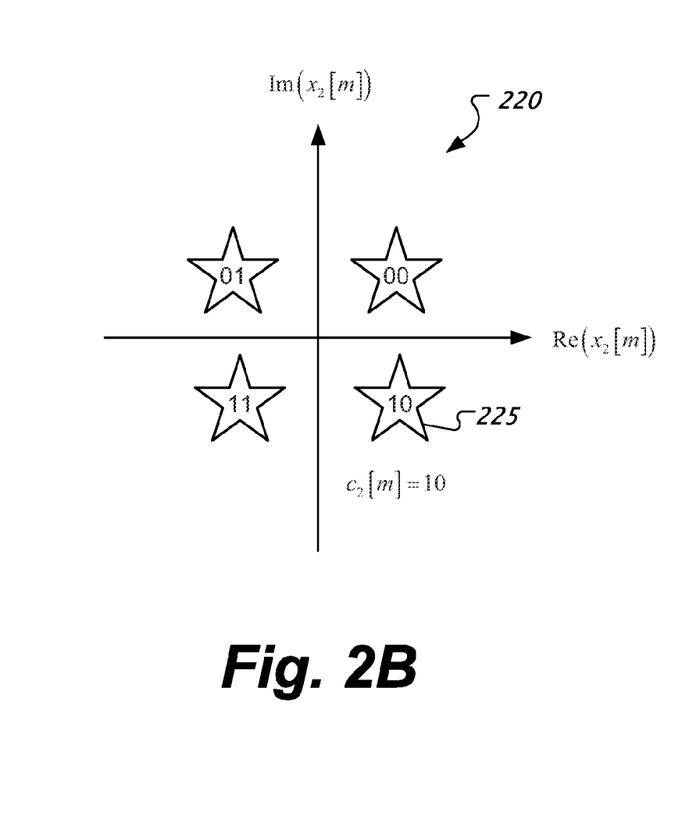
Figure 2C:
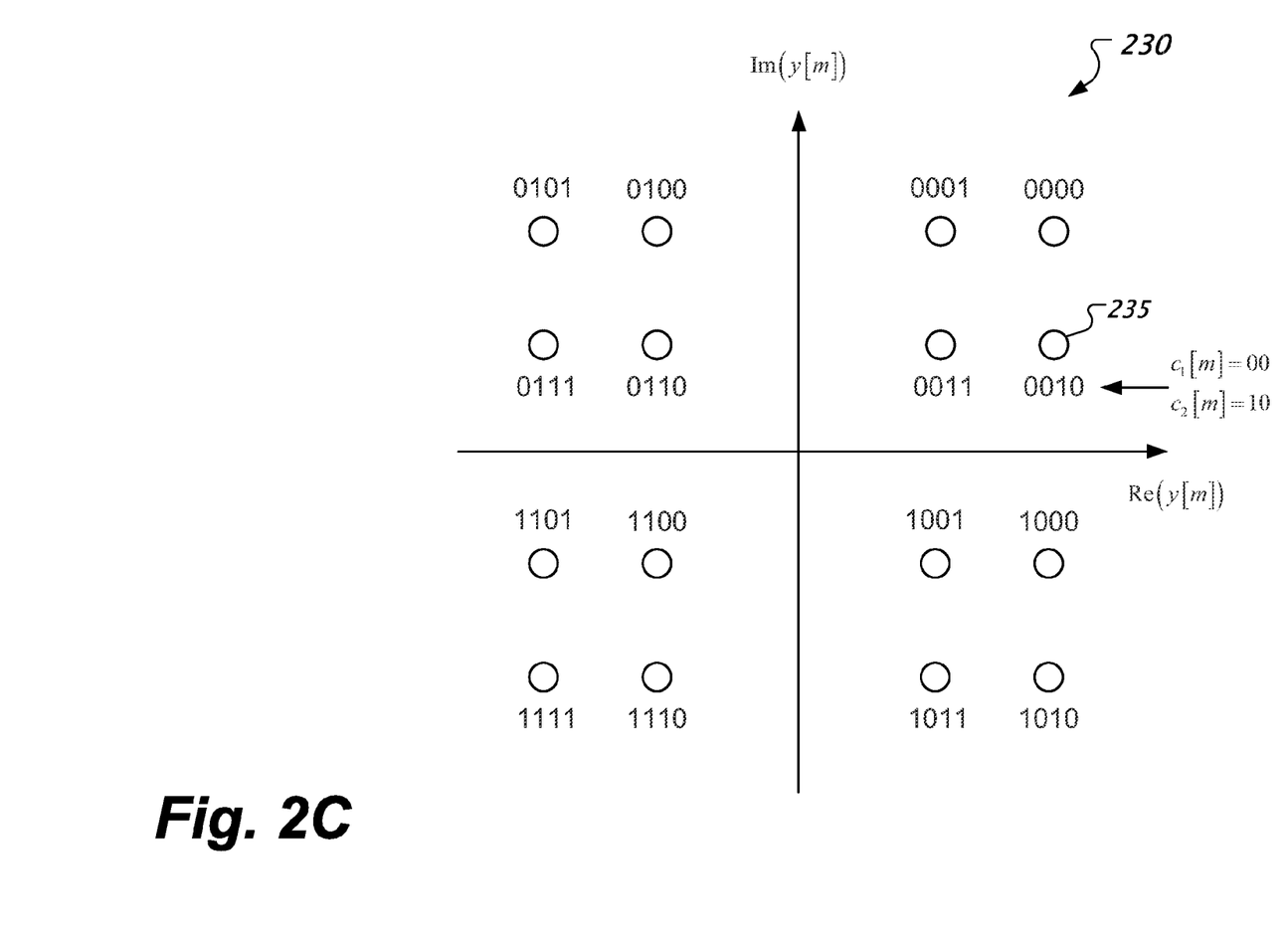

FIGS. 2A, 2B, 2C show different facets of an example of a combination of two signals that are based on different signal constellations. In this example, modulation is based on Quadruple Phase Shift Keying (QPSK), e.g., 4-QAM.

FIG. 2A shows an example of a graph representing a first signal constellation 210. A pair of two coded bits $c_1[m]=00$ is mapped to a QPSK constellation symbol 215. A symbol can be represented by a complex value which includes two real numbers that represent an in-phase (I) dimension and a quadrature (Q) dimension, respectively. The first signal $x_1[m]$ is a modulation of the coded bits based on the first signal constellation 210.

FIG. 2B shows an example of a graph representing a second signal constellation 220. A pair of two coded bits $c_1[m]=10$ is mapped to a QPSK constellation symbol 225. The second signal $x_2[m]$ is a modulation of the coded bits based on the second signal constellation 220.

FIG. 2C shows an example of a graph that depicts points based on a combination of constellations. A wireless communication device can transmit a signal that is based on a superimposition of the QPSK constellation symbols 215, 225. In this example, a graph 230 depicts a combination of points associated with the first and second constellations 210, 220.

A superimposition of the symbols 215, 225 is represented by a point 235 labeled '0010' on the graph 230. The representation can include noise and different channel gains for the respective symbols 215, 225. Because the constituent constellations 210, 220 include 4 points, their combination yields a constellation of 16 points.

A wireless communication device can perform hard decoding of L signals among K superimposed signals. An order of signal decoding is represented by an index numeration of 1, 2, ..., L. The signal that is decoded first is assigned index 1, the signal that is decoded second is assigned index 2, and so on. The wireless communication device can detect the first signal $\hat{x}_1[m]$ over a first combined constellation $M_1 \times \ldots \times M_K$ of K superimposed signals and decode $\hat{b}_1[m]$. In some implementations, detecting a signal includes performing maximum likelihood detection. In some implementations, detecting a signal includes performing minimum distance detection. Detecting a first signal can include computing one or more channel gains.

Detecting a second signal in a received signal can include using a first signal interference-cancelled version of the received signal to detect $\hat{x}_2[m]$ over a combined constellation. Detecting a second signal can include re-encoding $\hat{b}_1[m]$ to generate $\hat{\hat{x}}_1[m]$ and computing a modified received signal $v_2$ based on subtracting $h_1[m]\hat{\hat{x}}_1[m]$ from $y[m]$. The subtraction can remove the interference caused by the first signal to the other signals.

Using the modified received signal, the wireless communication device can detect the second signal over a second combined constellation $M_2 \times \ldots \times M_K$. The second combined constellation is based on signal constellations that correspond to the remaining K−1 superimposed signal(s), respectively. The wireless communication device can repeat the process for additional signals, if required.

In some implementations, computing a modified received signal includes computing a signal based on $\hat{\hat{x}}_i$ $$v_{i+1}[m]=v_i[m]-h_i[m]\hat{\hat{x}}_i[m]$$

where $v_i[m]=y[m]$. Detecting the (i+1)-th signal can include using the (i+1)-th combined constellation given by $M_{i+1} \times \ldots \times M_K$ to detect the signal. If the (i+1)-th signal is the K-th signal, then the combined constellation reduces to $M_K$.

A wireless communication device can use a maximum likelihood detector that considers one or more combinations of signal constellations. The maximum likelihood detector can detect a signal $\hat{x}$ based on $$\hat{i} = \mathrm{argmax}_i f_{M_i \times \ldots \times M_K}\{y \mid x_i, x_{i+1}, \ldots, x_K\}$$

where f is a CPDF that is considered over the combined constellation of $M_{i+1} \times \ldots \times M_K$, where $\hat{x}$ corresponds to the $\hat{i}$-th x. Here, the CPDF f function can be represented by:

$$\frac{1}{(\pi\sigma_n^2)^{K-i+1}} \sum_{(x_{i+1},\ldots,x_K) \in M_{i+1} \times \ldots \times M_K} \exp\left(\frac{-\left|y - \sum_{k=i}^{K} h_k x_k\right|^2}{\sigma_n^2}\right)$$

The maximum likelihood detector can consider all signal points of $M_{i+1} \times \ldots \times M_K$ around each signal point of $x_i[m]$.

A wireless communication device can use a minimum distance detector that considers one or more combinations of signal constellations. A minimum distance detector can detect a signal $\hat{x}$ based on $$\hat{i} = \mathrm{argmax}_i \exp\left(-\left|y - \sum_{k=i}^{K} h_k x_k\right|^2 \Big/ \sigma_n^2\right)$$

where $\hat{x}$ corresponds to the $\hat{i}$-th x. In some implementations, to detect a signal $\hat{x}$, a minimum distance detector can compute:

$$\hat{i} = \mathrm{argmax}_i \left|y - \sum_{k=i}^{K} h_k x_k\right|^2.$$

The minimum distance detector can consider the nearest signal point of $M_i \times \ldots \times M_K$ to calculate a minimum distance hard decoding metric. The minimum distance detector can extract $\hat{x}_i[m]$ from the detected set of $(\hat{x}_i, \ldots, \hat{x}_K)$, which is one of the combined constellation points.

Figure 3A:
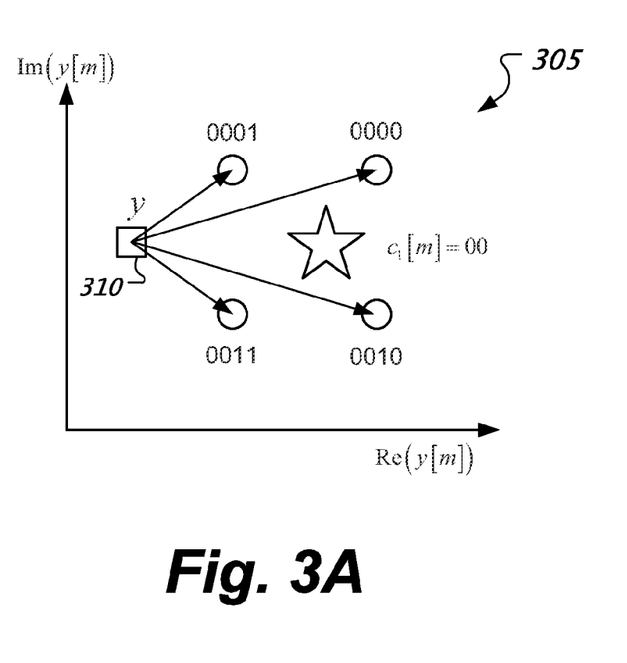
FIGS. 3A and 3B show different detection techniques that use a combined constellation.
Figure 3B:
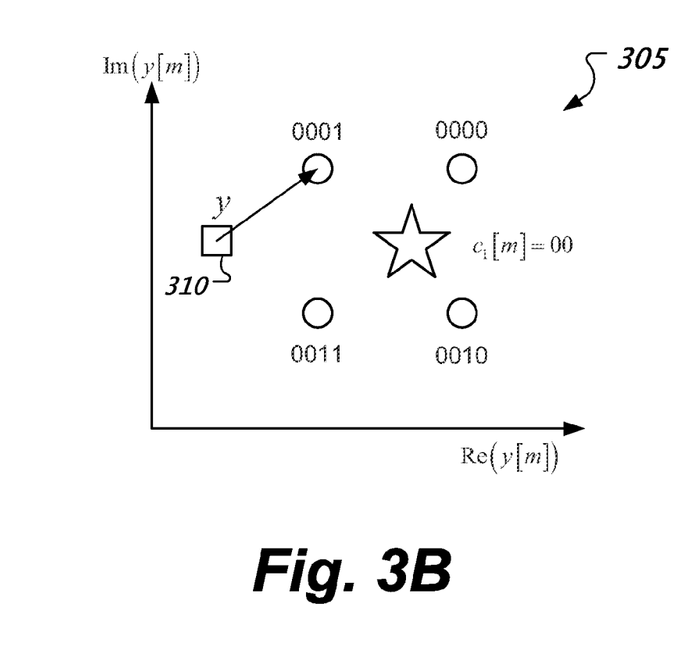

FIGS. 3A and 3B show different detection techniques that use a combined constellation. A received signal sample y[m] point 310 is shown on the upper-right hand quadrant 305 of the graph 230 of FIG. 2C which depicts an example of a combined constellation. Other quadrants of the graph 230 are omitted for clarity.

FIG. 3A shows a representation of a maximum likelihood detection technique. A maximum likelihood detection technique determines a pair of encoded bits $c_1[m]$ associated with a QPSK constellation symbol 215 based on considering the received signal sample point 310 with respect to multiple points on the combined constellation. Considerations of other points on other quadrants of the graph 230 are possible.

FIG. 3B shows a representation of a minimum distance detection technique. A minimum distance detection technique determines a pair of encoded bits $c_1[m]$ associated with a QPSK constellation symbol 215 based on distances between the received signal sample point 310 and points associated with the combined constellation. Computing distances with other points on other quadrants of the graph 230 are possible.

Figure 4A:
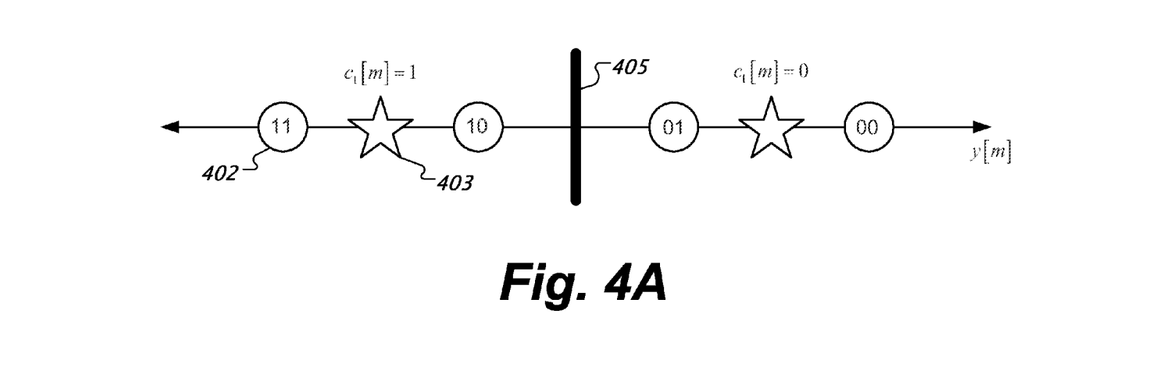
FIGS. 4A and 4B show examples of decision boundary layouts for different channel gain environments.
Figure 4B:
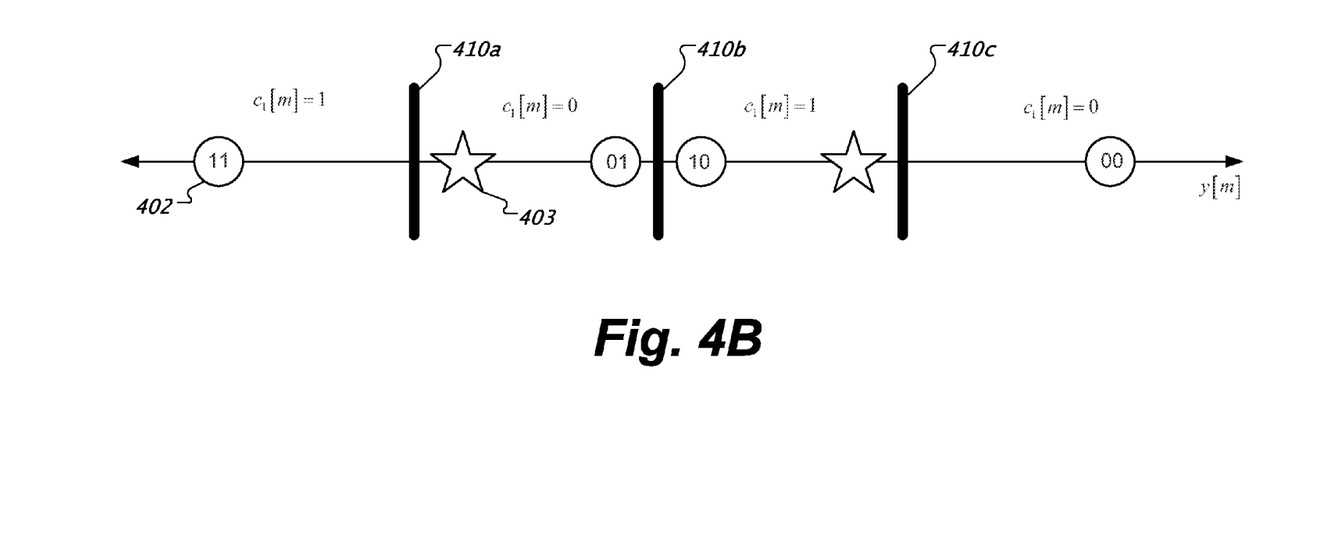

FIGS. 4A and 4B show examples of decision boundary layouts for different channel gain environments. In these examples, a receive signal is represented by:

$$y[m]=h_1[m]x_1[m]+h_2[m]x_2[m]+n[m]$$

where $x_1[m]$ and $x_2[m]$ are binary PAM signals (e.g., signal 1 and signal 2, respectively). A wireless communication device performs detection and decoding on $x_1[m]$ and then on $x_2[m]$. Points 402 on a combined constellation are represented by circles in FIGS. 4A and 4B. Points 403 on a constellation used in the modulation of signal 1 are represented by stars in FIGS. 4A and 4B.

FIG. 4A shows an example of a decision boundary for a channel gain environment where $h_1[m]>h_2[m]$. A hard decoding technique can use a decision boundary 405 to determine $\hat{x}_1[m]$ and associated encoded bits $c_1[m]$ from a received signal. In this environment where $h_1[m]>h_2[m]$, there can be a single decision boundary 405 in the middle. If a received signal is on the left side of the decision boundary 405, a detection of $c_1[m]=1$ is declared since the circles that are associated with $c_1[m]=1$, (e.g., circles of 11 or 10) give smaller distances than the circles associated with $c_1[m]=0$. If a received signal is on the right side of the decision boundary 405, an opposite decision is made.

FIG. 4B shows an example of decision boundary layout for $h_1[m]<h_2[m]$. A hard decoding technique can use multiple decision boundaries 410a, 410b, 410c to determine $\hat{x}_1[m]$ and associated encoded bits $c_1[m]$ from a received signal. The technique can use the decision boundaries 410a, 410b, 410c to consider all four signal points 402 that are a joint combination of signals 1 and 2. In this environment where $h_1[m]<h_2[m]$, there can be three decision boundaries 4100a, 4100b, 4100c and note that the order of circles 01 and 10 is reversed, compared to FIG. 4A. If a received signal is on the far left side of the left decision boundary 410a, a detection of $c_1[m]=0$ is declared since the circle of 11 of $c_1[m]=1$ gives smaller distance than the circles of $c_1[m]=0$. If a received signal is between the left decision boundary 410a and the middle decision boundary 410b, a detection of $c_1[m]=0$ is declared since the circle of 01 of $c_1[m]=0$ gives a smaller distance than the circles of $c_1[m]=1$. The same reasoning can be applied to the remaining regions.

Figure 5:
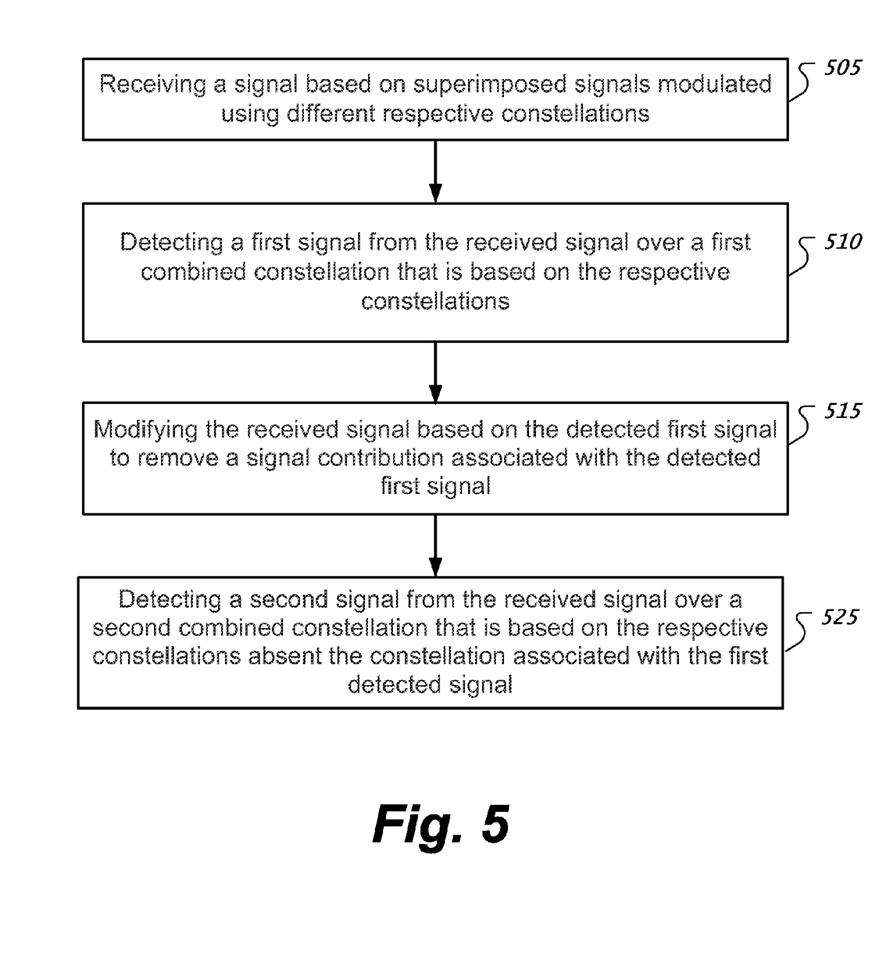
FIG. 5 shows an example of a communication process that uses combined constellations.

FIG. 5 shows an example of a communication process that uses combined constellations. At 505, a communication process receives a signal based on superimposed signals modulated using different respective constellations. Receiving a signal can include receiving digital samples of a signal. For example, a wireless communication device can receive a signal that represents concurrent wireless data communications. The wireless data communications correspond to signals that have been independently produced, e.g., independently encoded and independently modulated using different constellations.

At 510, the communication process detects a first signal from the received signal over a first combined constellation that is based on the respective constellations. The combined constellation can be a product of the respective constellations.

In some implementations, detecting a signal includes using a maximum likelihood detector that considers the points associated with a combined constellation. In some implementations, detecting a signal includes using a minimum distance detector that considers the points associated with a combined constellation. In some implementations, detecting a signal includes using a product of the respective constellations. In some implementations, detecting a signal includes using one or more points associated with a product of the respective constellations.

At 515, the communication process modifies the received signal based on the detected first signal to remove a signal contribution associated with the detected first signal. The communication process can include decoding the first detected signal, re-encoding the decoded version, and re-modulating the re-encoded version. Modifying a received signal can include subtracting a scaled re-modulated version from the received signal, where the scaling factor is based on a wireless channel gain associated with the first detected signal. In some implementations, a wireless channel gain is determined based on one or more training sequences.

At 525, the communication process detects a second signal from the received signal over a second combined constellation that is based on the respective constellations absent the constellation associated with the first detected signal. The communication process can prune the identified constellation from a group of the respective constellations. The communication process can construct the second combined constellation based on a product of the constellations in the pruned version of the group. In some implementations, combinations of the constellations are predetermined before the communication process starts.

In some implementations, the communication process identifies a constellation associated with the first detected signal. Identifying a constellation can include obtaining an identifier of a constellation indicated by a detector to be the constellation associated with the first detected signal. Identifying a constellation can include determining whether a point of a detected signal matches one of the respective constellations. In some implementations, the communication process detects a second signal from the received signal over a second combined constellation that is based on the respective constellations absent the identified constellation associated with the first detected signal.

Figure 6:
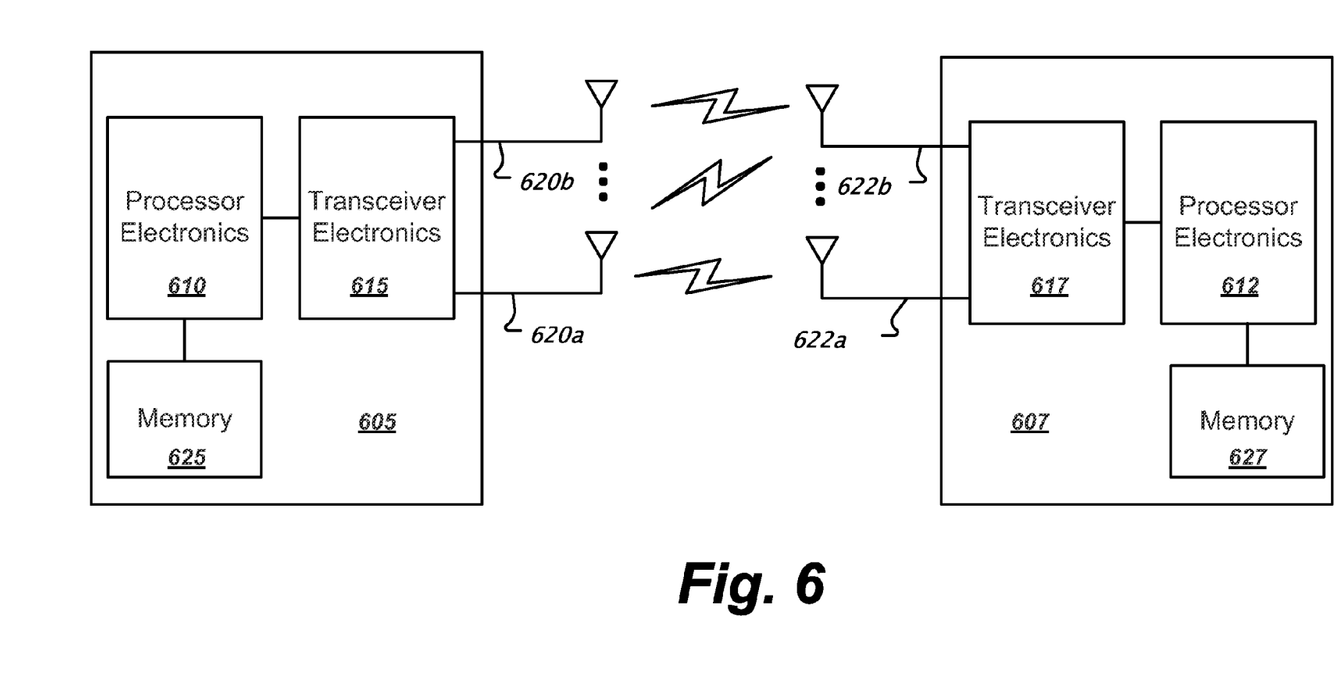
FIG. 6 shows an example of a wireless network with two wireless communication devices.

FIG. 6 shows an example of a wireless network with two wireless communication devices. Wireless communication devices 605, 607 such as an access point (AP), base station (BS), wireless headset, access terminal (AT), client station, or mobile station (MS) can include circuitry such as processor electronics 610, 612. Processor electronics 610, 612 can include one or more processors that implement one or more techniques presented in this disclosure. Wireless communication devices 605, 607 include circuitry such as transceiver electronics 615, 617 to send and receive wireless signals over one or more antennas 620a, 620b, 622a, 622b. In some implementations, transceiver electronics 615, 617 include integrated transmitting and receiving circuitry. Wireless communication devices 605, 607 include one or more memories 625, 627 configured to store information such as data, instructions, or both. In some implementations, wireless communication devices 605, 607 include dedicated circuitry for transmitting and dedicated circuitry for receiving. Transceiver electronics 615, 617 can include one or more of: detector, decoder, modulator, and encoder. Transceiver electronics 615, 617 can include one or more analog circuits.

In concurrent wireless communications via interference channels, multiple transmitters are transmitting signals to multiple receivers. In some implementations, a multiple-in-multiple-out (MIMO) configured wireless communication device uses two or more antennas to concurrently transmit data to two or more receive antennas. The receive antennas can correspond to two or more devices or can correspond to another MIMO device that has two or more antennas. For example, a signal $x_i[m]$ is transmitted from the i-th transmitter (e.g., i-th device or i-th antenna of a device) to the j-th receiver (e.g., j-th device or antenna of a device) with channel gain $h_{ji}[m]$. An on-diagonal element $h_{ii}$ represents a channel gain for the i-th signal, whereas off-diagonal elements of h represent channel interference between signals.

Two or more signals of an interference channel can be transmitted and received. A signal can include two or more signal elements such as a signal for common information denoted by a 'c' and a signal for private information denoted by a 'p.' Information deemed common is intended for all receivers in a group, whereas information deemed private is intended for a specific receiver in the group. A Han-Kobayashi technique can be used for two or more signals for interference channel based communications.

For example, two transmitters can transmit two signals (e.g., signal $x_1[m]$ and signal $x_2[m]$) to two receivers. Here, $x_1[m]=x_{1c}[m]+x_{1p}[m]$ and $x_2[m]=x_{2c}[m]+x_{2p}[m]$. The signal $x_{1c}[m]$ is associated with signal constellation $M_{1c}$; $x_{1p}[m]$ with $M_{1p}$; $x_{2c}[m]$ with $M_{2c}$; and $x_{2p}[m]$ with $M_{2p}$. The signal received by a first receiver is represented by:

$$y_1[m]=h_{11}[m]x_{1c}[m]+h_{12}[m]x_{2c}[m]+h_{11}[m]x_{1p}[m]+h_{12}[m]x_{2p}[m]+n_1[m].$$

The signal received by a second receiver is represented by:

$$y_2[m]=h_{22}[m]x_{2c}[m]+h_{21}[m]x_{1c}[m]+h_{22}[m]x_{2p}[m]+h_{21}[m]x_{1p}[m]+n_2[m].$$

The first receiver detects $\hat{x}_{1c}[m]$ from $y_1[m]$ over the combined constellation of $M_{1c} \times M_{2c} \times M_{1p} \times M_{2p}$. The receiver decodes $\hat{x}_{1c}[m]$ into $\hat{b}_{1c}[m]$. The receiver re-encodes $\hat{b}_{1c}[m]$ into $\hat{\hat{x}}_{1c}[m]$. A first modified received signal is generated by subtracting $h_{11}[m]\hat{\hat{x}}_{1c}[m]$ from $y_1[m]$. The receiver detect $\hat{x}_{2c}[m]$ from the first modified received signal over the combined constellation of $M_{2c} \times M_{1p} \times M_{2p}$. The receiver decodes $\hat{x}_{2c}[m]$ into $\hat{b}_{2c}[m]$. The receiver re-encodes $\hat{b}_{2c}[m]$ into $\hat{\hat{x}}_{2c}[m]$. A second modified received signal is generated by subtracting $h_{12}[m]\hat{\hat{x}}_{2c}[m]$ from the first modified received signal. The receiver detects $\hat{x}_{1p}[m]$ from the second modified received signal over the combined constellation of $M_{1p} \times M_{2p}$, and decodes $\hat{x}_{1p}[m]$ into $\hat{b}_{1p}[m]$. The second receiver performs similar operations, but with index 1 and 2 swapped.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A method comprising:
   receiving, at a wireless communication device, a signal that represents concurrent wireless data communications, wherein the signal is based on superimposed signals modulated using different respective constellations;
   detecting a first signal from the received signal over a first combined constellation, the first combined constellation being based on a product of the respective constellations, wherein detecting the first signal comprises using all constellation points within the product of the respective constellations;
   identifying, from among the respective constellations, a first respective constellation that is associated with the first detected signal;
   modifying the received signal based on the first detected signal and the first respective constellation to remove a signal contribution associated with the first detected signal; and
   detecting a second signal from the modified received signal over a second constellation, wherein the second constellation is based on the respective constellations absent the first respective constellation.

2. The method of claim 1, wherein the superimposed signals comprise i) a first signal modulated based on the first respective constellation of the respective constellations, and ii) a second signal modulated based on a second respective constellation of the respective constellations.

3. The method of claim 1, wherein detecting the first signal comprises using a maximum likelihood detector that considers points associated with the first combined constellation.

4. The method of claim 1, wherein detecting the first signal comprises using a minimum distance detector that considers points associated with the first combined constellation.

5. The method of claim 1, wherein receiving the signal comprises receiving a signal from one of two or more antennas configured for multiple-in-multiple-out (MIMO) based wireless communications.

6. The method of claim 1, comprising:
generating the second constellation based on a product of the respective constellations absent the first respective constellation.

7. A system comprising:
circuitry configured to receive a signal that represents concurrent wireless data communications, wherein the signal is based on superimposed signals modulated using different respective constellations; and
processor electronics configured to perform operations comprising i) detecting a first signal from the received signal over a first combined constellation by using all constellation points within a product of the respective constellations, the first combined constellation being based on the product of the respective constellations, ii) identifying, from among the respective constellations, a first respective constellation that is associated with the first detected signal, iii) modifying the received signal based on the first detected signal and the first respective constellation to remove a signal contribution associated with the first detected signal, and iv) detecting a second signal from the modified received signal over a second constellation, wherein the second constellation is based on the respective constellations absent the first respective constellation.

8. The system of claim 7, wherein the superimposed signals comprise i) a first signal modulated based on the first respective constellation of the respective constellations, and ii) a second signal modulated based on a second respective constellation of the respective constellations.

9. The system of claim 7, wherein detecting the first signal comprises using a maximum likelihood detector that considers points associated with the first combined constellation.

10. The system of claim 7, wherein detecting the first signal comprises using a minimum distance detector that considers points associated with the first combined constellation.

11. The system of claim 7, wherein receiving the signal comprises receiving a signal from one of two or more antennas configured for multiple-in-multiple-out (MIMO) based wireless communications.

12. The system of claim 7, the operations further comprising:
generating the second constellation based on a product of the respective constellations absent the first respective constellation.

13. An apparatus comprising:
circuitry configured to store information indicative of a received signal that represents concurrent wireless data communications, wherein the received signal is based on superimposed signals modulated using different respective constellations; and
circuitry configured to i) detect a first signal from the received signal over a first combined constellation by using all constellation points within a product of the respective constellations, the first combined constellation being based on the product of the respective constellations, ii) identify, from among the respective constellations, a first respective constellation that is associated with the first detected signal, iii) modify the received signal based on the first detected signal and the first respective constellation to remove a signal contribution associated with the first detected signal, and iv) circuitry configured to perform detecting a second signal from the modified received signal over a second constellation, wherein the second constellation is based on the respective constellations absent the first respective constellation.

14. The apparatus of claim 13, wherein the superimposed signals comprise i) a first signal modulated based on the first respective constellation of the respective constellations, and ii) a second signal modulated based on a second respective constellation of the respective constellations.

15. The apparatus of claim 13, wherein the first detected signal is as based on an output of a maximum likelihood detector that considers points associated with the first combined constellation.

16. The apparatus of claim 13, wherein the first detected signal is as based on an output of a minimum distance detector that considers points associated with the first combined constellation.

17. The apparatus of claim 13, wherein the received signal is received via at least one of two or more antennas configured for multiple-in-multiple-out (MIMO) based wireless communications.

18. The apparatus of claim 13, comprising:
circuitry to generate the second constellation based on a product of the respective constellations absent the first respective constellation.

\* \* \* \* \*